(12) United States Patent
Chen et al.

(10) Patent No.: US 11,507,090 B2
(45) Date of Patent: Nov. 22, 2022

(54) SYSTEMS AND METHODS FOR VEHICLE MOTION CONTROL WITH INTERACTIVE OBJECT ANNOTATION

(71) Applicant: Uber Technologies, Inc., San Francisco, CA (US)

(72) Inventors: Sean Shanshi Chen, San Francisco, CA (US); Samann Ghorbanian-Matloob, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 320 days.

(21) Appl. No.: 16/686,401

(22) Filed: Nov. 18, 2019

(65) Prior Publication Data

US 2020/0401135 A1 Dec. 24, 2020

Related U.S. Application Data

(60) Provisional application No. 62/863,566, filed on Jun. 19, 2019.

(51) Int. Cl.
*G05D 1/00* (2006.01)
*G06N 20/00* (2019.01)
*G05D 1/02* (2020.01)

(52) U.S. Cl.
CPC ......... *G05D 1/0088* (2013.01); *G05D 1/0212* (2013.01); *G06N 20/00* (2019.01); *G05D 2201/0213* (2013.01)

(58) Field of Classification Search
CPC ............... G05D 1/0088; G05D 1/0212; G05D 2201/0213; G06N 20/00
USPC .......................................................... 701/24
See application file for complete search history.

(56) References Cited

U.S. PATENT DOCUMENTS

| | | | | |
|---|---|---|---|---|
| 9,489,635 | B1 * | 11/2016 | Zhu | G06V 10/987 |
| 10,353,053 | B2 * | 7/2019 | Rohani | G06N 20/00 |
| 10,468,062 | B1 * | 11/2019 | Levinson | G01S 17/87 |
| 11,093,819 | B1 * | 8/2021 | Li | G06N 3/0445 |
| 11,106,925 | B2 * | 8/2021 | Pogorelik | G06V 10/82 |
| 2018/0373963 | A1 * | 12/2018 | Lo | G06V 20/58 |
| 2019/0122077 | A1 * | 4/2019 | Tsishkou | G06K 9/6259 |
| 2020/0202168 | A1 * | 6/2020 | Mao | G06K 9/628 |
| 2021/0094540 | A1 * | 4/2021 | Bagschik | G06T 7/20 |

(Continued)

*Primary Examiner* — Yazan A Soofi
(74) *Attorney, Agent, or Firm* — Schwegman Lundberg & Woessner, P.A.

(57) ABSTRACT

Systems and methods for vehicle motion control with interactive object annotation are provided. A method can include obtaining data indicative of a plurality of objects within a surrounding environment of the autonomous vehicle. For example, the plurality of objects can include at least at one problem object encountered by the autonomous vehicle while navigating a planned route. The method can include determining a group of objects of the plurality of objects. For example, the group of objects can include the problem object and one or more other objects in proximity to the problem object. The method can include determining a classification update to be applied to the group of objects. The method can include applying the classification update to the group of objects. The method can include providing data indicative of the classification update for the group of objects to the autonomous vehicle for use in motion planning.

20 Claims, 8 Drawing Sheets

(56) References Cited

U.S. PATENT DOCUMENTS

2022/0024140 A1\* 1/2022 Pinskiy .................. B33Y 50/02
2022/0026920 A1\* 1/2022 Ebrahimi Afrouzi ........................
                                                    G05D 1/0274
2022/0027664 A1\* 1/2022 Amin ................... G06K 9/6228

\* cited by examiner

SYSTEMS AND METHODS FOR VEHICLE MOTION CONTROL WITH INTERACTIVE OBJECT ANNOTATION

PRIORITY CLAIM

The present application is based on and claims benefit of U.S. Provisional Application No. 62/863,566, having a filing date of Jul. 19, 2019, which is incorporated by reference herein in its entirety.

FIELD

The present disclosure relates generally to autonomous vehicle motion control. In particular, autonomous vehicle motion control can be affected by annotations to interactive objects within the surrounding environment of the autonomous vehicle

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a method for vehicle motion control with interactive object annotation. The method can include obtaining, by a computing system comprising one or more computing devices that are remote from an autonomous vehicle, data indicative of a plurality of objects within a surrounding environment of the autonomous vehicle. For example, the plurality of objects can include at least one problem object encountered by the autonomous vehicle while navigating a planned route. The method can include determining, by the computing system, a group of objects of the plurality of objects. For instance, the group of objects can include the problem object and one or more other objects in proximity to the problem object. The method can include determining, by the computing system, a classification update to be applied to the group of objects. The method can include applying, by the computing system, the classification update to the group of objects. And, the method can include providing, by the computing system, data indicative of the classification update for the group of objects to the autonomous vehicle for use in motion planning.

Other example aspects of the present disclosure are directed to systems, methods, vehicles, apparatuses, tangible, non-transitory computer-readable media, and memory devices for controlling autonomous vehicles.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
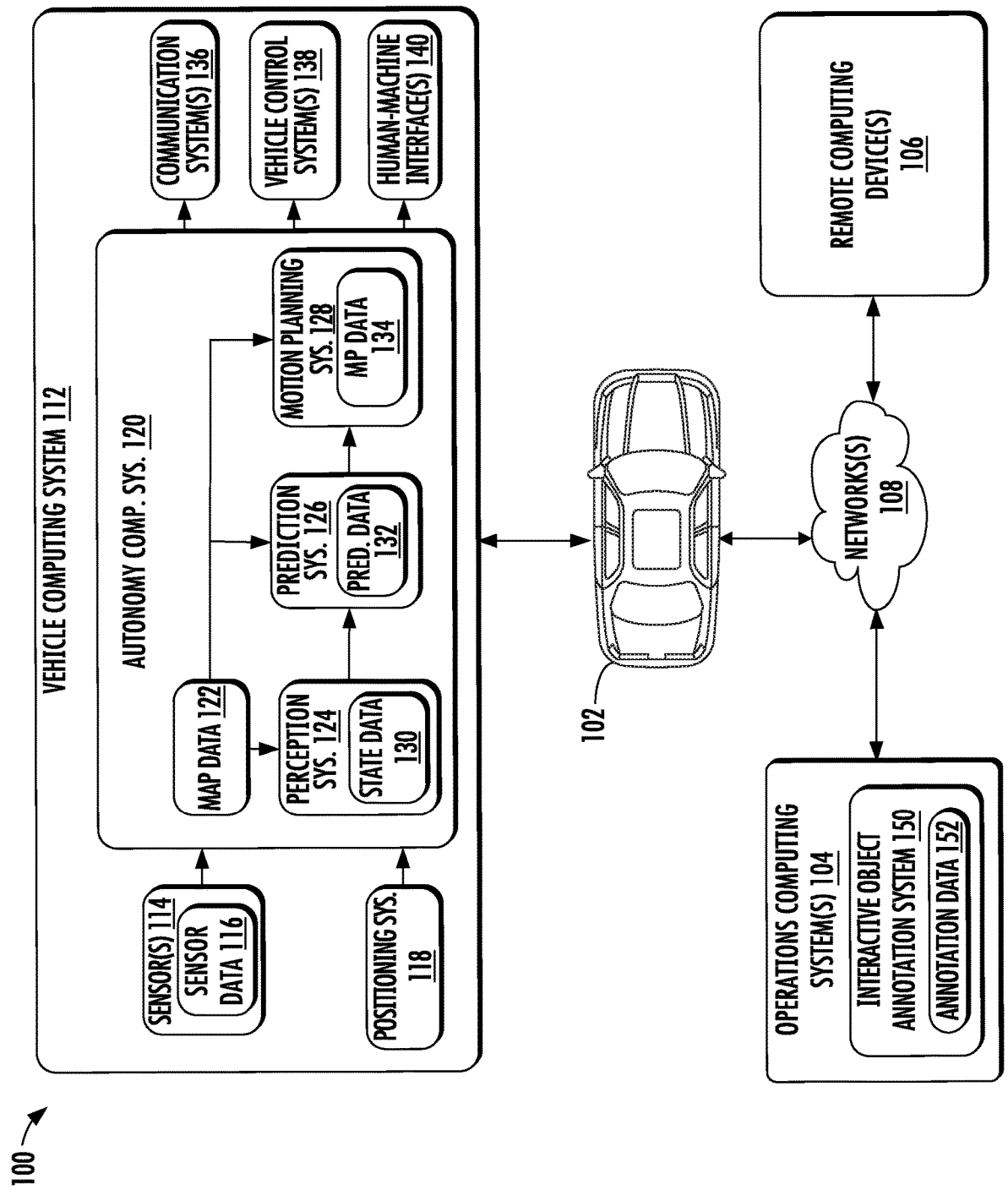
FIG. 1 depicts a block diagram of an example system for controlling the navigation of an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

The present disclosure is directed to improved systems and methods for determining a vehicle motion plan based on one or more objects within the vehicle's surrounding environment. During travel, a vehicle may interact with one or more objects. For example, a vehicle may be required to stop for a pedestrian, pass another vehicle, slow down for a stop light, etc. To increase safety, it can be important determine a motion plan that independently accounts for each object. Effectively dealing with multiple objects and a number of travel decisions, however, can become computationally challenging. The present disclosure proposes systems and methods that increase the efficiency motion planning while improving the vehicle safety.

Example aspects of the present disclosure are directed to improved techniques to accurately and efficiently handle unexpected collections of obstacles when encountered by an autonomous vehicle (sensed, perceived, detected, etc.) during navigation of a route. In particular, the systems and methods of the present disclosure provide for interactive object annotation to allow for identification and real-time reclassification of multiple objects when an autonomous vehicle encounters unexpected objects in a roadway. As an example, an autonomous vehicle may come upon unexpected objects in a roadway to be avoided, such as foreign object debris, cluttered or changing construction zones, and/or the like. In such situations, the autonomous vehicle may get "stuck" (e.g., uncertain how to avoid the unexpected object(s) to proceed on a route) for safety measures and may need to receive assistance from off-board the autonomous vehicle (e.g., from outside the vehicle autonomy systems) to plan a maneuver past the object(s). In particular, if the autonomous vehicle is "stuck" on an unexpected object that is part of a collection or group of objects, it is inefficient and time consuming to deal with each of those individual objects, one at a time, as the autonomous vehicle gets stuck on each consecutive object in the group. Thus, the systems and methods of the present disclosure provide improved techniques through interactive object annotation to allow for identification and reclassification of a group of objects such that an autonomous vehicle can more efficiently and accurately plan its motion and navigate with regard to groups of unexpected objects affecting the progress of the autonomous vehicle along a route.

More particularly, an entity (e.g., service provider, owner, manager) can use one or more vehicles (e.g., ground-based vehicles, flight vehicles, other type vehicles, etc.) to provide a vehicle service such as a transportation service (e.g., rideshare service), a courier service, a delivery service, etc. The vehicle(s) can be autonomous vehicles that can include a variety of systems onboard the autonomous vehicle (e.g., located on or within the autonomous vehicle) to control the operation of the vehicle. For instance, the autonomous vehicle can include one or more data acquisition systems (e.g., sensors, image capture devices), one or more vehicle computing systems (e.g. for providing autonomous operation), one or more vehicle control systems, (e.g., for controlling acceleration, braking, steering, etc.), and/or the like.

The data acquisition system(s) can acquire sensor data (e.g., lidar data, radar data, image data, etc.) associated with one or more objects (e.g., pedestrians, vehicles, etc.) that are within the environment of the autonomous vehicle (e.g., within a field of view) and/or sensor data associated with the vehicle path (e.g., path shape, boundaries, markings, etc.). The sensor data can include information that describes the location (e.g., in three-dimensional space relative to the autonomous vehicle) of points that correspond to objects within the surrounding environment of the autonomous vehicle (e.g., at one or more times). The data acquisition system(s) can provide such sensor data to the vehicle computing system.

In addition to the sensor data, the vehicle computing system can obtain map data that provides other detailed information about the surrounding environment of the autonomous vehicle. For example, the map data can provide information regarding: the identity and location of various roadways, road segments, buildings, or other items; the location and direction of traffic lanes (e.g. the boundaries, location, direction, etc. of a travel lane, parking lane, a turning lane, a bicycle lane, and/or other lanes within a particular travel way); traffic control data (e.g., the location and instructions of signage, traffic signals, and/or other traffic control devices); and/or any other map data that provides information that can assist the autonomous vehicle in comprehending and perceiving its surrounding environment and its relationship thereto.

The vehicle computing system can include one or more computing devices and can include various subsystems that can cooperate to perceive the surrounding environment of the autonomous vehicle and determine a motion plan for controlling the motion of the autonomous vehicle. For instance, the vehicle computing system can include a perception system, a prediction system, and a motion planning system. The vehicle computing system can receive and process the sensor data to generate an appropriate motion plan through the vehicle's surrounding environment.

The perception system can detect one or more objects that are proximate to the autonomous vehicle based on the sensor data. In particular, in some implementations, the perception system can determine, for each object, a classification of each object and a classification confidence associated therewith. For example, an object can be classified as a static object or a dynamic object (an actor). Furthermore, the classification can identify the type of object (e.g., a vehicle, bicycle, pedestrian, debris, road marker, etc.). The classification confidence can indicate the vehicle's level of confidence in the accuracy of the classification determined for that object. The classification confidence can be expressed in one or more manners, such as, for example, a percentage, decimal, fraction, semantic category (e.g., low, medium, high), etc.

The perception system can also determine, for each object, state data that describes a current state of such object. As examples, the state data for each object can describe an estimate of the object's: current location (also referred to as position); current speed/velocity; current acceleration; current heading; current orientation; size/footprint; class (e.g., vehicle class versus pedestrian class versus bicycle class, etc.); and/or other state information. In some implementations, the perception system can determine state data for each object over a number of iterations. In particular, the perception system can update the state data for each object at each iteration. Thus, the perception system can detect and track objects (e.g., vehicles, bicycles, pedestrians, etc.) that are proximate to the autonomous vehicle over time, and thereby produce a representation of the world around an autonomous vehicle along with its state (e.g., a presentation of the objects within a scene at the current time along with the states of the objects).

The prediction system can receive the state data from the perception system and predict one or more future locations for each object based on such state data. For example, the prediction system can predict where each object will be located within the next 2 seconds, 5 seconds, 10 seconds, 20 seconds, etc. As one example, an object can be predicted to adhere to its current trajectory according to its current speed. As another example, other, more sophisticated prediction techniques or modeling can be used.

The motion planning system can determine a motion plan for the autonomous vehicle based at least in part on predicted one or more future locations for the object provided by the prediction system and/or the state data for the object provided by the perception system. Stated differently, given information about the classification and current locations of objects and/or predicted future locations of proximate objects, the motion planning system can determine a motion plan for the autonomous vehicle that best navigates the autonomous vehicle along the determined travel route relative to the objects at such locations.

As one example, in some implementations, the motion planning system can determine a cost function for each of one or more candidate motion plans for the autonomous vehicle based at least in part on the current locations and/or predicted future locations of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

Thus, given information about the classifications, current locations, and/or predicted future locations of objects, the motion planning system can determine a cost of adhering to a particular candidate pathway. The motion planning system can select or determine a motion plan for the autonomous vehicle based at least in part on the cost function(s). For example, the motion plan that minimizes the cost function can be selected or otherwise determined. The motion planning system then can provide the selected motion plan to a vehicle controller that controls one or more vehicle controls (e.g., actuators or other devices that control acceleration, steering, braking, etc.) to execute the selected motion plan.

Moreover, the autonomous vehicle can be configured to communicate with one or more computing devices that are remote from the autonomous vehicle. For example, the autonomous vehicle can communicate with a remote computing system that can be associated with the entity, such as the entity's operations computing system. The operations computing system can include a plurality of system clients that can help the entity monitor, communicate with, manage, etc. autonomous vehicles. In this way, the entity can manage the autonomous vehicles to provide the vehicle services of the entity.

According to an aspect of the present disclosure, an entity's operations computing system can include an interactive object annotation system to facilitate the identification of a group of objects (e.g., based on data provided by the autonomous vehicle to the operations computing system) and the real-time (and/or at least near real-time) reclassification of the objects within the group. This can allow the autonomous vehicle to efficiently and accurately navigate with regard to groups of unexpected objects in a roadway. By way of an example, while navigating a route, an autonomous vehicle may encounter (e.g., sense, perceive, detect, etc.) a collection or group of objects in a roadway (e.g., foreign debris, construction traffic control device, etc.) and the autonomous vehicle may become stuck on the collection of objects (e.g., unable to navigate past, etc.). For example, the autonomous vehicle may become stuck because the autonomous vehicle may have detected objects in the collection as a wrong class of object (e.g., detected static objects as moving objects, etc.) or may be unable to classify an object (e.g., classification confidence is below a threshold level). Thus, the object the autonomous vehicle is stuck on may be considered a problem object that may require intervention for the autonomous vehicle to handle appropriately (e.g., navigate past, etc.). The autonomous vehicle (e.g., vehicle computing system) can provide data indicative of the current scene (e.g., data regarding objects and the surrounding environment of the autonomous vehicle (telemetry data), request for remote assistance, etc.), including the collection of objects, to the operations computing system.

The interactive object annotation system can obtain the data regarding a plurality of objects in the surrounding environment of the vehicle and provide the data to a remote operator (e.g., display via a graphical user interface, etc.). In some implementations, the interactive object annotation system can provide for highlighting or otherwise visualizing the object(s) (e.g. problem object) that the autonomous vehicle is stuck on (e.g. reacting to) in a user interface that presents a rendering of the autonomous vehicle's environment on a display device (e.g., screen, etc.). If the problem object that the autonomous vehicle is included in a group of objects (e.g., a collection of debris, construction control devices, etc.), the interactive object annotation system can identify the group of objects within the autonomous vehicle environment and allow for selection of one or more objects within the group of objects (in addition to the problem object) that should have a new/updated classification applied. For example, an operator can select multiple objects and identify a new/updated classification by providing user input via the user interface. The interactive object annotation system can determine the new/updated classification for the problem object(s) based at least in part on such user input. The new/updated classification can be applied simultaneously to all the objects in the selected group of objects and then provided to the autonomous vehicle (e.g., vehicle computing system) to facilitate the autonomous vehicle implementing maneuvers with regard to the group of objects such that the autonomous vehicle can continue on its route. For example, a group of objects (e.g., construction cones, branches, other debris, etc.) can be identified and new/updated classification of "static object" can be applied to all the objects in the group. The new/updated classification can also include an indication for the autonomous vehicle to "pass left" or "pass right" of the group of objects to ensure appropriate maneuvering with regard to the group of objects. Additionally, a new/updated classification can indicate that object(s) are not static (e.g., moving) to identify that the autonomous vehicle should remain queued behind the moving object(s).

According to another aspect of the present disclosure, in some implementations, the interactive object annotation system can automatically classify a group of objects without user input (e.g., from a remote assist). For example, the interactive object annotation system can include a model and/or heuristics for processing vehicle data (e.g., sensor data, state data, etc.) and outputting a classification of a group of objects. For example, the model can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. As an example, the model can include a classification model for classifying groups of objects within an autonomous vehicle environment, where the model is trained using sets of labeled training data (e.g., sensor data including perceived objects with classification labels, etc.).

The interactive object annotation system can obtain the data regarding a plurality of objects in the surrounding environment of the autonomous vehicle and the object(s)

that the autonomous vehicle is stuck on in the surrounding environment. The interactive object annotation system can provide the data as input to the model and/or heuristics configured to determine objects from the plurality of objects that should be grouped together and to determine a new/updated classification that should be applied to the group of objects.

According to another aspect of the present disclosure, interactive object annotation data can be stored, for example, by the vehicle computing system, in vehicle driving logs, by the operations computing system, and/or the like. For example, once a new/updated classification has been applied to an object, the autonomous vehicle can store the original classification along with the new/updated classification for the object such that the object classification(s) are tracked as the vehicle moves (e.g., as the vehicle continues to perceive the object). As another example, the original classification and new/updated classification for an object can be stored to use as data points in training models (e.g., compare model generated classification to operator generated classification, etc.). In some implementations, interactive object annotation data (e.g., new object classification) can be provided as input back to the autonomous vehicle (e.g., vehicle computing system) in such a way that autonomy sub-systems (e.g., prediction, etc.) may be able to learn from cases when an object really was (or was not) static.

According to another aspect of the present disclosure, an interactive object annotation system can include constraints on what objects can be selected and/or classified together. For instance, pre-defined rules can be established limiting what objects can be selected and/or reclassified, for example, by a remote operator. As an example, rules with regard to object distance from the vehicle, proximity of objects to each other, speed of the vehicle, and/or the like may be defined to determine what objects may be selected to form a group of objects for application of a new/updated classification. As an example, a series of construction warning devices positioned in a roadway but spaced at significant distances from each other (e.g., 5 feet, 10 feet, etc.) may not be available to be selected as a group of objects to be classified simultaneously as a group. As another example, a group of foreign debris objects such as fallen branches, boxes, and/or the like that are clustered to the side of a travel lane may be selected as a group of objects and a static classification may be applied to the group to allow the autonomous vehicle to navigate around the group of objects.

According to another aspect of the present disclosure, an interactive object annotation system can include various safeguards with regard to the classification of groups of objects simultaneously. For example, in some implementations, the interactive object annotation system may provide for final confirmation of a new/updated classification of a group of objects by a remote operator before the new/updated classifications are applied (e.g., via confirmation dialogue boxes on a user interface, etc.). As another example, in some implementations, a new/updated classification for a group of objects may be required to be reviewed and/or confirmed by more than one remote operator before the new/updated classifications are applied. In some implementations, an interactive object annotation system may include a confirmation process. For example, the interactive object annotation system may provide indications of the results of a new/updated classification (e.g., a possible vehicle path resulting from the classification) that needs to be confirmed before the new classification is applied to the group of objects. In some implementations, the interactive object annotation system may have the ability to override a new/updated classification selected by a remote operator if there is high-confidence in an alternative decision in a particular scene. For example, the interactive object annotation system may nullify a new/updated classification of "static" from an original classification of "moving" if the object being classified/reclassified moves a certain distance from its original position. Additionally, an autonomous vehicle (e.g., vehicle computing system) can perform an analysis of objects and the surrounding environment to ensure that the autonomous vehicle could maneuver along a planned path safely, regardless of the new/updated classification applied to the group of objects. For example, if a new/updated classification for a group of objects indicates "static pass right" when it should have been "static pass left," the autonomous vehicle can recognize that it cannot pass safely on the right and not complete the maneuver.

Various means can be configured to perform the methods and processes described herein. For example, a computing system can include data obtaining unit(s), visualization unit(s), object determination unit(s), classification update unit(s), data providing unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain data (e.g., telemetry data) from an autonomous vehicle that includes an indication of object(s) the autonomous vehicle is currently stuck on (e.g., unable to navigate). A data obtaining unit is an example of means obtaining such data from an autonomous vehicle at an operations computing system as described herein.

The means can be configured to provide data with regard to a plurality of objects within the surrounding environment of the vehicle for display. For example, the means can be configured to visualize the vehicle environment including the plurality of objects via a graphical user interface. In some implementations, the means can be configured to indicate a problem object of the plurality of objects in the surrounding environment that the vehicle is currently stuck on (e.g., reacting to). A visualization unit is one example of a means for providing data for display and selection as described herein.

The means can be configured to determine a group of objects, including a problem object, from the plurality of objects. For example, based on the displayed plurality of objects, the means can be configured to determine a selection of one or more objects in addition to the problem object to form a group of objects that can have a new/updated classification applied simultaneously. An object determination unit is one example of a means for determining a group of objects as described herein.

The means can be configured to determine a new/updated classification for the group of objects. For example, the means can be configured to determine the selection of a new/updated classification that should be applied to the group of objects that will facilitate the autonomous vehicle appropriately navigating with regard to the group of objects. The means can be configured to simultaneously apply the new/updated classification to each of the objects within the group of objects. A classification update unit is one example of a means for determining and applying a classification update to a group of objects as described herein.

The means can be configured to provide the applied classification updates for the group of objects to the autonomous vehicle to facilitate motion planning to navigate the autonomous vehicle with regard to the objects. A data providing unit is one example of a means for providing the updated object classification to the autonomous vehicle as described herein.

The systems and methods described herein provide a number of technical effects and benefits. For instance, the systems and methods can provide techniques for accurate and efficient resolution of issues with regard to groups of obstacles encountered by an autonomous vehicle while navigating a route. Interactive object annotation, as described herein, can allow for more efficient handling of multiple objects that an autonomous vehicle may be stuck on (e.g., reacting to) simultaneously, thereby improving workflow (e.g., remote operator workflow) and improving rider experience.

The systems and methods described herein provide additional technical effects and benefits including facilitating appropriate handling of unexpected objects rather than constraining out the area due to unexpected objects impacting navigation, thus avoiding unnecessary constriction of areas that can be serviced by the autonomous vehicles.

The systems and methods of the present disclosure can provide an improvement to vehicle computing technology, such as autonomous vehicle computing technology and the remote computing systems associated therewith. For instance, the use of interactive object annotation can provide for improvements in the use of communication resources and processing resources by allowing for multiple problem objects to be handled simultaneously instead of requiring each object to be reported and responded to individually.

With reference now to the FIGS., example aspects of the present disclosure will be discussed in further detail. FIG. 1 illustrates an example vehicle computing system 100 according to example embodiments of the present disclosure. The vehicle computing system 100 can be associated with a vehicle 105. The vehicle computing system 100 can be located onboard (e.g., included on and/or within) the vehicle 105.

FIG. 1 depicts a block diagram of an example system 100 for controlling the navigation of an autonomous vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; a human-machine interface 140; an interactive object annotation system 150; and annotation data 152.

The operations computing system 104 can be associated with a service entity that can provide one or more vehicle services to a plurality of users, passengers, riders, etc. via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), coordinates of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), the status of one or more vehicle systems, the status of one or more autonomous robots, and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102; and/or the like. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data another computing device or computing system (e.g., the operations computing system 104). Further, the one or more remote computing devices 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile, truck, etc.), an aircraft, and/or another type of vehicle (e.g., watercraft, bicycle, scooter, other light electric vehicle, etc.). The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, a sleep mode, and/or the like. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the vehicle, the state of one or more passengers of the vehicle, and/or the state of an environment in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, lights, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 (e.g., within a sensors field of view, range, etc.) based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around a vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

As described in further detail herein with reference to FIGS. 2-7, the system 100 can include an interactive object annotation system 150. Although depicted within the operations computing system(s) 104, one or more portions of the interactive object annotation system 150 can be included in the autonomous vehicle (e.g., as a part of the autonomy computing system 120, motion planning system 126, etc.), in the operations computing system(s) 104, and/or in the one or more remote computing devices 106. For example, in some implementations, the interactive object annotation system 150 can be included onboard the autonomous vehicle 102 and can be configured to obtain sensor data 116 from one or more sensor(s) 114 onboard the autonomous vehicle 102. Alternatively, in some implementations, the interactive object annotation system 150 can be remotely located from the autonomous vehicle 102 (e.g., in the operations computing system(s) 104, remote computing device(s) 106, etc.) and can be communicatively coupled the autonomous vehicle 102 (e.g., via one or more network(s) 108). The interactive object annotation system 150 can facilitate the identification of a group of objects (e.g., based at least in part on data provided by the autonomous vehicle 102 and/or another system) and/or the real-time (and/or at least near real-time) reclassification of the objects within the group to provide for the autonomous vehicle 102 to efficiently and accurately navigate with regard to groups of unexpected objects in a roadway.

By way of example, while navigating a route, an autonomous vehicle 102 may encounter (e.g., sense, perceive, detect, etc.) a collection or group of objects in a roadway (e.g., foreign debris, construction traffic control device, etc.) and the autonomous vehicle 102 may become stuck on the collection of objects (e.g., unable to navigate past, etc.). For example, the autonomous vehicle 102 may become stuck because the autonomous vehicle 102 may have detected objects in the collection as a wrong class of object (e.g., detected static objects as moving objects, etc.) or may be unable to classify an object (e.g., classification confidence is below a threshold level). The object the autonomous vehicle 102 is stuck on may be considered a problem object that may require intervention for the autonomous vehicle 102 to handle appropriately (e.g., navigate past, etc.). The autonomous vehicle 102 (e.g., vehicle computing system 112) can provide data indicative of the current scene (e.g., data regarding objects and the surrounding environment of the autonomous vehicle 102 (telemetry data), request for remote assistance, etc.), including the collection of objects, to the operations computing system (e.g., interaction object annotation system 150). In response, the interactive object annotation system 150 can determine annotation data 152 and provide the annotation data 152 to the autonomous vehicle 102. For example, the annotation data 152 can be indicative of a classification update for a group of objects proximate to the problem object. In addition, or alternatively, the annotation data 152 can include one or more actions necessary to properly deal with the one or more problem objects within the current scene.

The motion planning system 128 can determine a motion plan and generate motion plan data 134 for the vehicle 102 based at least in part on the prediction data 132 (the state data 130 and/or other data) and/or the annotation data 152. The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). For example, the motion planning system 128 can determine that one or more actions of the annotation data 152 is a safe or not unsafe action based on the surrounding environment of the autonomous vehicle 102. The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the systems onboard the vehicle 102. The communications system 136 can also be configured to enable the autonomous vehicle to communicate with and/or provide and/or receive data and/or signals from a remote computing device 106 associated with a user, an item (e.g., an item to be picked-up for a courier service), and/or the like. The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., operator's seat, etc.). Additionally, or alternatively, a display device can be viewable by a user of the vehicle 102 that is located in the rear of the vehicle 102 (e.g., a passenger seat).

The vehicle computing system 112 can communicate data between the vehicle 102 and the human-machine interface 140. The data can be communicated to and/or from the vehicle 102 directly and/or indirectly (e.g., via another computing system). For example, in some implementations, the data can be communicated directly from the vehicle computing system 112 to the human-machine interface 140. In addition, or alternatively, the vehicle computing system 112 can communicate with the human-machine interface 140 indirectly, via another computing system, such as, for example, a system of a third party vehicle provider/vendor.

Figure 2:
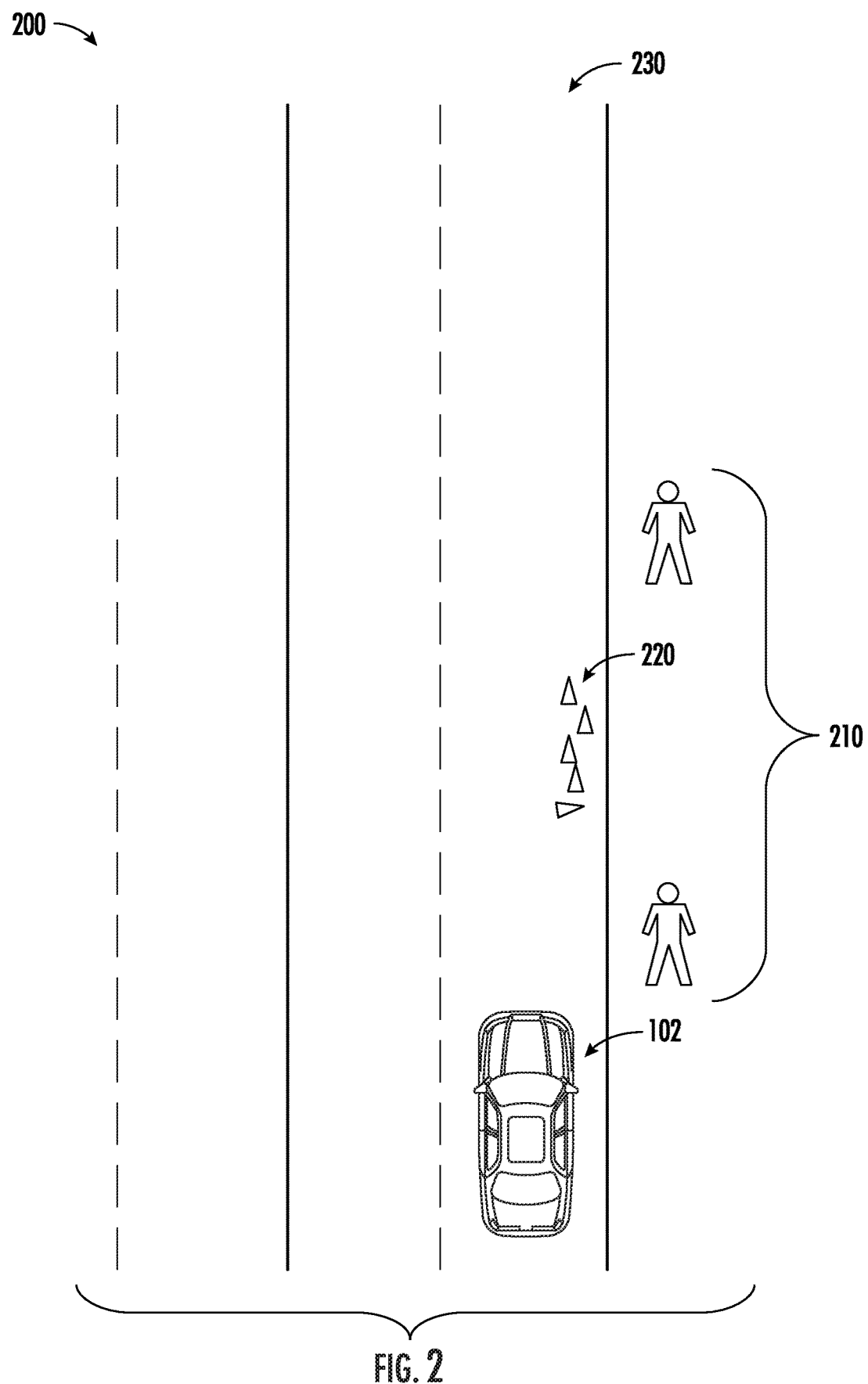
FIG. 2 depicts an illustration of an autonomous vehicle environment with a group of unexpected objects according to example embodiments of the present disclosure.

FIG. 2 depicts an illustration of an autonomous vehicle environment 200 with a group of unexpected objects 220 according to example embodiments of the present disclosure. By way of example, the autonomous vehicle 102 can travel on a roadway 230 such as that depicted in the example autonomous vehicle environment 200. The autonomous vehicle environment 200 can include a plurality of objects 210. The plurality of objects 210 can include one or more expected objects and one or more unexpected objects 220. By way of example, the autonomous vehicle 102 can expect to detect one or more pedestrians, traffic signs, vehicles, etc. on or proximate to the roadway 230. However, the autonomous vehicle 102 may not expect one or more traffic cones, garbage, foreign debris, etc. on or proximate to the roadway 230.

While navigating a route, the autonomous vehicle 102 may encounter (e.g., sense, perceive, detect, etc.) a collection or group of unexpected objects 220 on the roadway 230 such as, for example, foreign debris, construction traffic control device, etc. In such a case, the autonomous vehicle 102 may become stuck on the collection of unexpected objects 220. For example, the autonomous vehicle 102 may be unable to identify one or more of the unexpected object(s) 220. Moreover, in some instances, the autonomous vehicle 102 may be unable to generally classify one or more of the unexpected objects 220. For example, the autonomous vehicle 102 may be unable to correctly classify one or more of the unexpected objects 220 as a static or moving object. In some cases, this can prevent the autonomous vehicle 102 from navigating past the one or more unexpected object(s) 220.

For example, the autonomous vehicle 102 can become stuck because the autonomous vehicle 102 may have detected objects in the collection of unexpected objects 220 as a wrong class of object (e.g., detected static objects as moving objects, etc.) or may be unable to classify an object (e.g., a classification confidence is below a threshold level). The object that the autonomous vehicle 102 is stuck on can be considered a problem object that can require an intervention for the autonomous vehicle 102 to handle appropriately (e.g., navigate past, etc.). In such a case, the autonomous vehicle 102 (e.g., vehicle computing system) can provide data indicative of the current scene to the interactive object annotation system 150. For example, the data indicative of the current scene can include data regarding the unexpected objects 220, the autonomous vehicle environment 200 (e.g., the surrounding environment of the autonomous vehicle), telemetry data, a request for remote assistance, etc. In this manner, the interactive object annotation system 150 can obtain data regarding the plurality of objects 210 within the surrounding environment of the vehicle.

Figure 3:
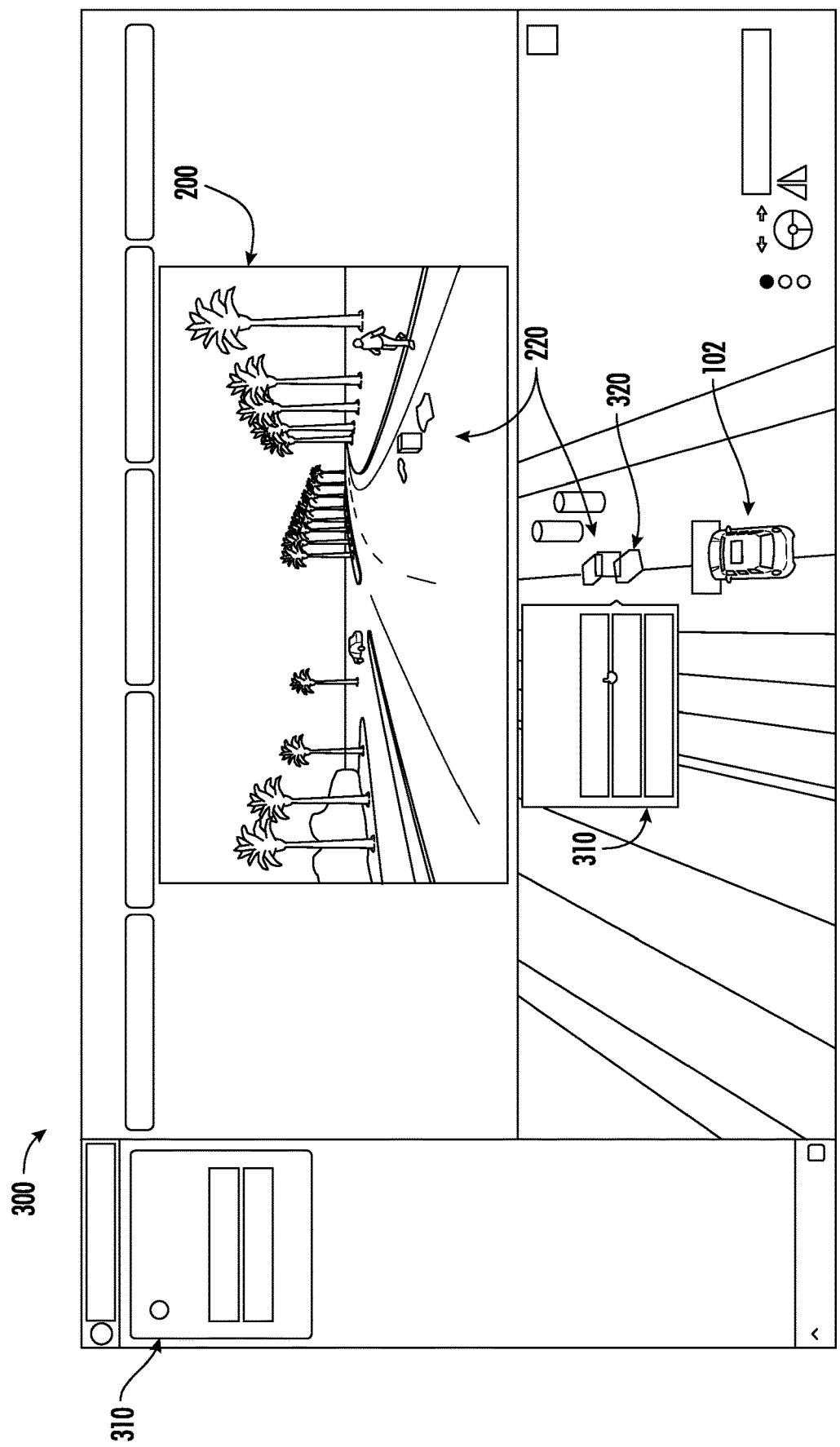
FIG. 3 depicts an example user interface display according to example embodiments of the present disclosure.

FIG. 3 depicts an example user interface display according to example embodiments of the present disclosure. In some implementations, the interactive object annotation system 150 can provide data regarding the plurality of objects to a remote operator. For example, the interactive object annotation system 150 can be configured to the display data indicative of the autonomous vehicle environment 200 via a graphical user interface 300. By way of example, the interactive object annotation system 150 can be configured to display at least one of a rendering of the autonomous vehicle environment 200, one or more interactive prompts 310, and/or one or more bounded areas 320 indicative of the plurality of objects 220 within the autonomous vehicle environment 200.

In some implementations, the interactive object annotation system 150 can provide for highlighting or otherwise visualizing the object(s) (e.g. problem object) that the autonomous vehicle is stuck on (e.g. reacting to). For example, the interactive object annotation system 150 can be configured to display one or more problem objects in a user interface 300 that presents a rendering of the autonomous vehicle's environment 200 on a display device (e.g., screen, etc.). If the problem object that the autonomous vehicle 102 is stuck on is included in a group of objects (e.g., unexpected objects 220, such as collection of debris, construction control devices, etc.), the interactive object annotation system 150 can identify the group of objects (e.g., unexpected objects 220) within the autonomous vehicle environment 200.

In addition, or alternatively, the interactive object annotation system 150 can allow for the selection of one or more objects within the group of objects (unexpected objects 220, such as collection of debris, construction control devices, etc.) that should have a new/updated classification applied. For example, an operator can select multiple objects and identify a new/updated classification by providing user input via the user interface 300. The operator can select one or more objects, for example, by providing input through the user interface 300 directly to a visual representation of the object (e.g., a rendering of the autonomous vehicle environment 200, one or more bounded areas 320 indicative of the plurality of unexpected objects 220, etc.). By way of example, a vehicle operator can select one or more objects within the group of objects (e.g., unexpected objects 220, etc.) by touching a representation of the object via a touch screen.

In some implementations, the interactive object annotation system 150 can provide one or more interactive prompts 310 indicative of one or more problem objects. To do so, the interactive object annotation system can identify at least one problem object from the plurality of objects 210. For example, the interactive object system can identify one or more problem objects based on user input (e.g., the selection of one or more object via the user interface, etc.). In addition, or alternatively, the interactive object annotation system can identify the one or more problem objects without user input (e.g., based on sensor data, etc.).

The interactive object annotation system can be configured to display one or more interactive prompts 310 for the at least one problem object. The one or more interactive prompts 310 can include data indicative of a respective problem object. In addition, in some implementations, the interactive prompts 310 can include one or more options to classify the object such as, for example, as a static object, a moving object, etc. Moreover, in some implementations, the interactive prompts 310 can include one or more options indicative of a vehicle movement such as, for example, pass left, pass right, etc. By way of example, the one or more vehicle movements can be indicative of a vehicle navigation change based on a new classification of the problem object.

In some implementations, the interactive object annotation system can display the one or more interactive prompts 310 in response to user input selecting one or more problem objects. For example, the interactive object annotation system can receive user input indicative of the one or more problem objects. In response, the interactive object annotation system can generate one or more interactive prompts for the one or more problem objects. The interactive object annotation system can display each of the one or more interactive prompts to the vehicle operator via the user interface 300.

Figure 4:
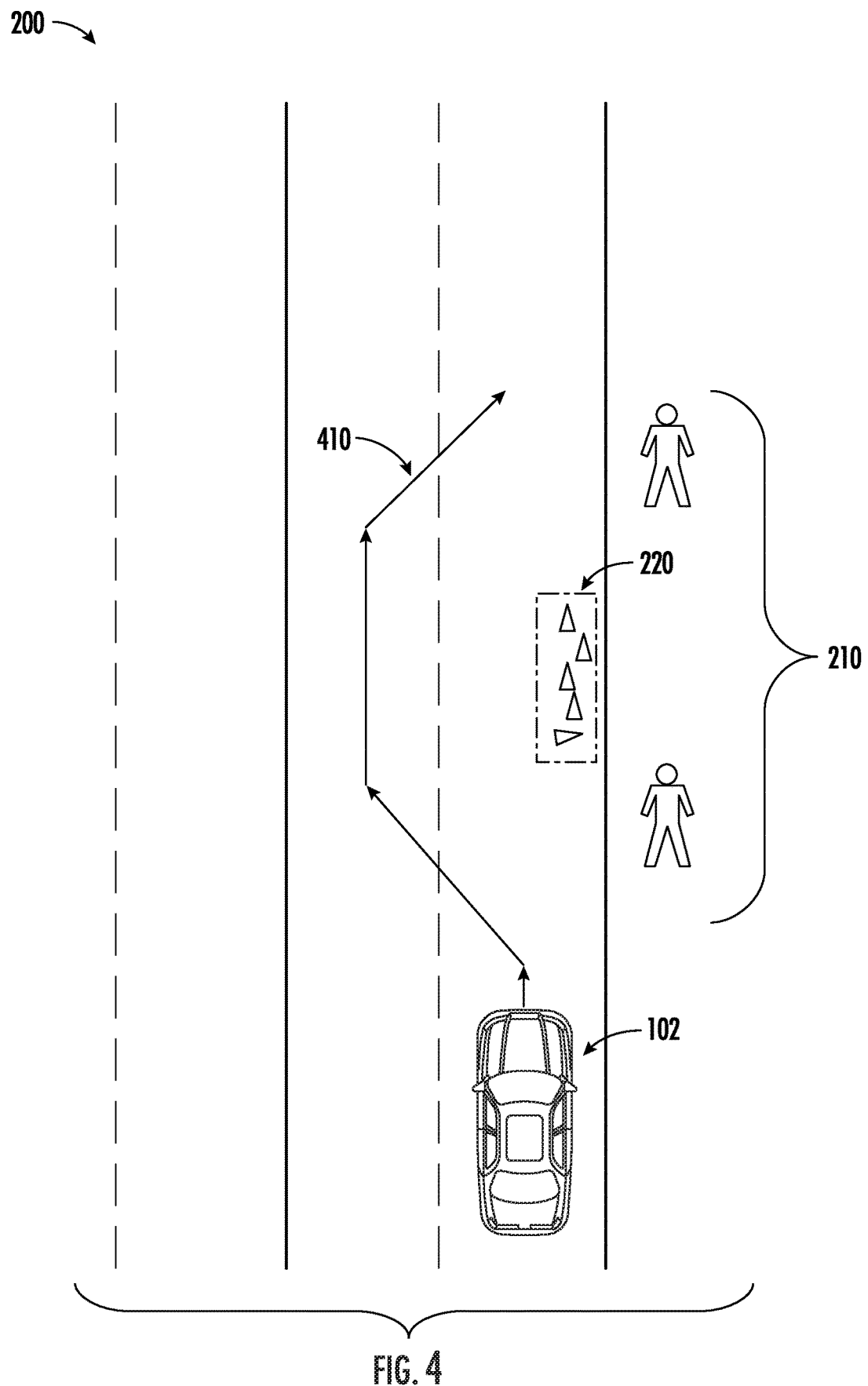
FIG. 4 depicts an illustration of an autonomous vehicle navigation change based on classifying a group of objects according to example embodiments of the present disclosure.

FIG. 4 depicts an illustration of an autonomous vehicle navigation change based on classifying a group of objects according to example embodiments of the present disclosure. For example, the interactive object annotation system can determine the new/updated classification for the one or more problem object(s) based at least in part on user input and/or one or more software models.

In some implementations, the interactive object annotation system can apply the new/updated classification for the one or more problem object(s) to a group of objects in the autonomous vehicle environment 200. For example, the interactive object annotation system can identify a group of objects such as unexpected objects 220. By way of example, the interactive annotation system can determine the group of objects (e.g., unexpected objects 220) based on user input selecting each of the one or more objects in the group of objects (e.g., highlight/selecting the group of objects, etc.). In addition, or alternatively, the interactive object annotation system can group together every unexpected object 220 in the autonomous vehicle environment. The new/updated classification can be applied simultaneously or concurrently to all the objects in the identified and/or selected group of objects (e.g., unexpected objects 220).

In this manner, the group of objects (e.g., unexpected objects 220) can be reclassified and provided to the autonomous vehicle 102 (e.g., vehicle computing system) as a group rather than individual objects. This, in turn, can enable the autonomous vehicle 102 to create a motion plan that deals with the objects as a single object. Thus, the reclassification can facilitate the autonomous vehicle 102 implementing maneuvers, such as a vehicle navigation change 410 with regard to the group of objects (e.g., unexpected objects 220, etc.) such that the autonomous vehicle 102 can continue on its route.

According to another aspect of the present disclosure, in some implementations, the interactive object annotation system can automatically classify a group of objects (e.g., unexpected objects 220) without user input (e.g., from a remote assist, vehicle operator, etc.). For example, the interactive object annotation system can include a model and/or heuristics for processing vehicle data (e.g., sensor data, state data, etc.) and outputting a classification of a group of objects (e.g., unexpected object 220). For example, the model can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. As an example, the model can include a classification model for classifying groups of objects (e.g., unexpected objects 220) within an autonomous vehicle environment 200, where the model is trained using sets of labeled training data (e.g., sensor data including perceived objects with classification labels, etc.).

For example, the interactive object annotation system can obtain the data regarding a plurality of objects (e.g., expected objects, unexpected object 220, etc.) in the surrounding environment of the autonomous vehicle 102 and the object(s) that the autonomous vehicle 102 is stuck on (e.g., unexpected object 220, problem objects, etc.) in the autonomous vehicle environment 200. The interactive object annotation system can provide the data as input to the model and/or heuristics configured to determine objects from the plurality of objects that should be grouped together and to determine a new/updated classification that should be applied to the group of objects (e.g., unexpected objects 220).

For example, a group of objects (e.g., unexpected objects 220 such as construction cones, branches, other debris, etc.) can be identified and annotation data can be determined for each object in the group and/or the group of objects together. Annotation data, for instance, can include a new/updated classification of each object and/or the group of objects (e.g., unexpected objects 220). In addition, or alternatively, annotation data can include one or more actions (e.g., vehicle navigation change 410) for dealing with the group of objects (e.g., unexpected objects 220).

By way of example, the new/updated classification of "static object" can be applied to all the objects in the group. The new/updated classification can also include an indication for the autonomous vehicle 102 to "pass left" or "pass right" of the group of objects to ensure appropriate maneuvering with regard to the group of objects. Additionally, a new/updated classification can indicate that object(s) are not static (e.g., moving) to identify that the autonomous vehicle 102 should remain queued behind the moving object(s). As one example, FIG. 4 illustrates a group of objects (e.g., unexpected objects 220) classified as static objects and a vehicle navigation change 410 of "past left" of the group of objects (e.g., unexpected objects 220).

According to another aspect of the present disclosure, interactive object annotation data 152 can be stored, for example, by the vehicle computing system 112, in vehicle driving logs, by the operations computing system 104, and/or the like. For example, once a new/updated classification has been applied to an object, the autonomous vehicle 102 can store the original classification along with the new/updated classification for the object such that the object classification(s) are tracked as the vehicle moves (e.g., as the vehicle continues to perceive the object).

As another example, the original classification and new/updated classification for an object can be stored to use as data points in training models (e.g., compare model generated classification to operator generated classification, etc.). In some implementations, interactive object annotation data (e.g., new object classification) can be provided as input back to the autonomous vehicle 102 (e.g., vehicle computing system) in such a way that autonomy sub-systems (e.g., prediction, etc.) may be able to learn from cases when an object really was (or was not) static.

According to another aspect of the present disclosure, the interactive object annotation system can include constraints on what objects can be selected and/or classified together. For instance, pre-defined rules can be established limiting what objects can be selected and/or reclassified, for example, by a remote operator. As an example, rules with regard to object distance from the vehicle, proximity of objects to each other, speed of the vehicle, and/or the like may be defined to determine what objects may be selected to form a group of objects for application of a new/updated classification. As an example, a series of construction warning devices positioned in a roadway but spaced at significant distances from each other (e.g., 5 feet, 10 feet, etc.) may not be available to be selected as a group of objects to be classified simultaneously as a group. As another example, a group of foreign debris objects such as fallen branches, boxes, and/or the like that are clustered to the side of a travel lane may be selected as a group of objects and a static classification may be applied to the group to allow the autonomous vehicle to navigate around the group of objects.

Figure 5:
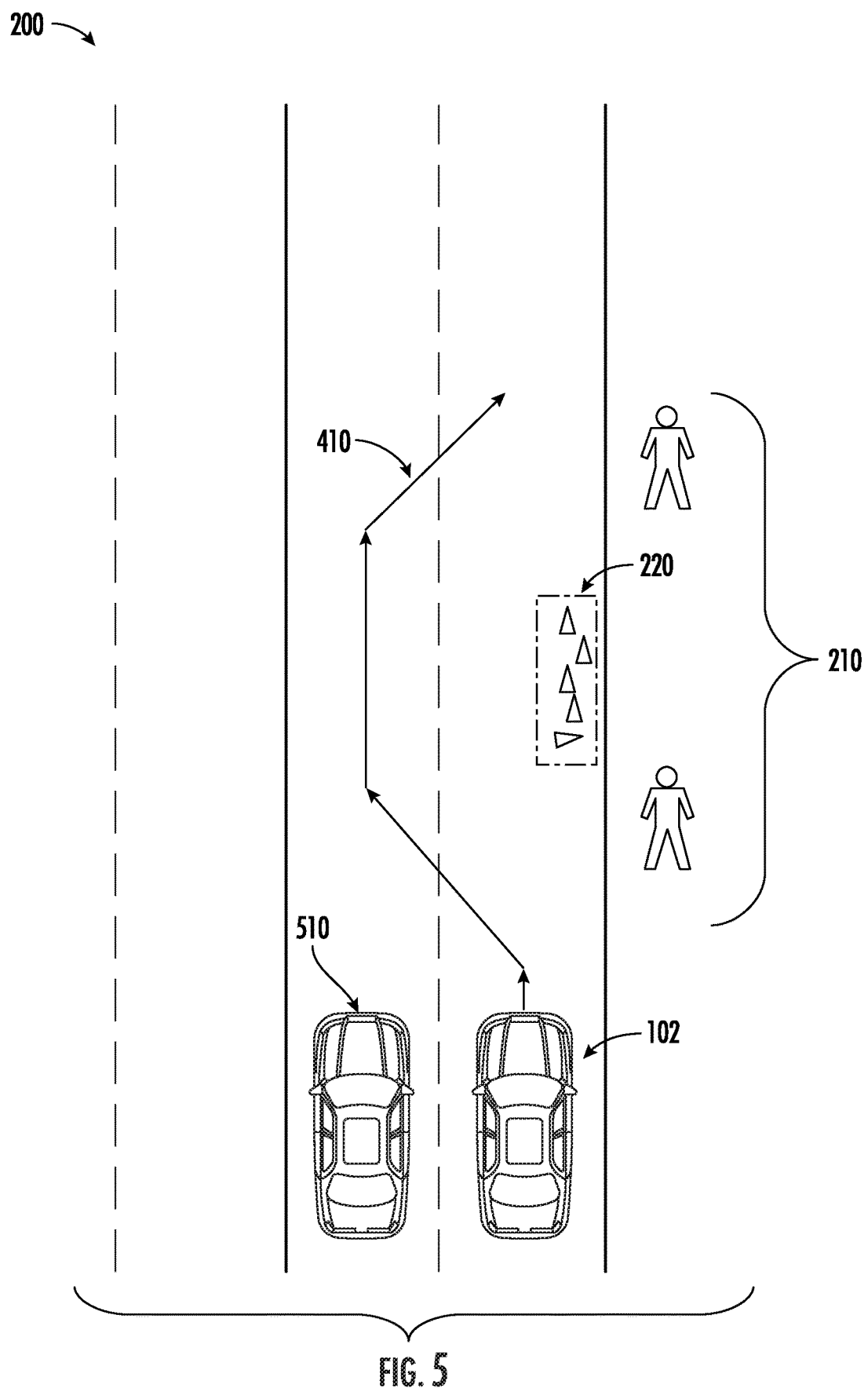
FIG. 5 depicts an illustration of an autonomous vehicle navigation change based on classifying a group of objects according to example embodiments of the present disclosure.

FIG. 5 depicts an illustration of an autonomous vehicle navigation change based on user input that violates roadway safety according to example embodiments of the present disclosure. In some implementations, the interactive object annotation system can be configured to provide annotation data (e.g., a group object classification, a travel vehicle navigation change 410, etc.) to the perception system, the prediction system, and/or the motion planning system of the autonomous vehicle 102. In such a case, the perception system, the prediction system, and/or the motion planning system can generate state data, prediction data and/or a motion plan, respectively, that considers the annotation data.

For example, the interactive annotation system can be configured to provide the annotation data to the perception system, thereby allowing the perception system to generate and/or modify state data according the annotation data. By way of example, the perception system can receive annotation data indicative of an object classification. In response, the perception system can generate state data indicative of the object classification. In addition, or alternatively, the perception system can update previously generated state data to the object classification of the annotation data.

Moreover, in some implementations, the interactive annotation system can be configured to provide the annotation data to a prediction system, thereby allowing the prediction system to generate and/or modify prediction data. By way of example, the predication system can receive annotation data indicative of an object classification. In response, the prediction system can generate prediction data that considers the object classification. For instance, the prediction system can generate prediction data indicative of nonmovement in the event that the annotation data is indicative of a static object. Moreover, in some implementations, the prediction system can update previously generated prediction data based, at least in part, on the annotation data. By way of example, in the event that the previously generated prediction data is generated based on a dynamically classified object and the annotation data indicates that the object is static, the prediction system can modify the previously generated prediction data to account for the updated classification. In addition, or alternatively, the interactive annotation system can be configured to provide the annotation data to a motion planning system. In this manner, an autonomous vehicle 102 can incorporate annotation data as a factor in determining a motion plan based at least in part on additional data regarding the surrounding environment of the autonomous vehicle 102.

For example, the interactive object annotation system, the autonomous vehicle 102 (e.g., vehicle computing system, motion planning system, etc.), etc. can perform an analysis of objects and/or the surrounding environment to ensure that the autonomous vehicle 102 can safely maneuver along a planned path (e.g., the vehicle navigation change 410), regardless of the new/updated classification applied to the group of objects (e.g., unexpected objects 220). For example, if a new/updated classification for a group of objects indicates "static pass right" when it should have been "static pass left," the autonomous vehicle can recognize that it cannot pass safely on the right and not complete the maneuver. As another example, the interactive object annotation system, the autonomous vehicle 102 (e.g., vehicle computing system, motion planning system, etc.), etc. can identify one or more objects (e.g., vehicle 510) within the surrounding environment of the autonomous vehicle 102 that may have an impact on the safety of initiating a vehicle navigation change 410. By way of example, the interactive object annotation system, the autonomous vehicle 102 (e.g., vehicle computing system, motion planning system, etc.), etc. can identify another object (e.g., vehicle 510) in a lane required for implementing annotation data indicative of a vehicle navigation change 410 (e.g., "static pass left"). In such a case, the interactive object annotation system, the autonomous vehicle 102 (e.g., vehicle computing system, motion planning system, etc.), etc. can disregard and/or postpone the vehicle navigation change 410, for example, until the object (e.g., vehicle 510) has passed.

In addition, or alternatively, the interactive object annotation system can include various safeguards with regard to the classification of groups of objects (e.g., unexpected objects 220) simultaneously. For example, in some implementations, the interactive object annotation system may provide for final confirmation of a new/updated classification of a group of objects by a remote operator before the new/updated classifications are applied (e.g., via confirmation dialogue boxes on a user interface, etc.). As another example, in some implementations, a new/updated classification for a group of objects may be required to be reviewed and/or confirmed by more than one remote operator before the new/updated classifications are applied. In some implementations, an interactive object annotation system may include a confirmation process. For example, the interactive object annotation system may provide indications of the results of a new/updated classification (e.g., a possible vehicle path resulting from the classification) that needs to be confirmed before the new classification is applied to the group of objects (e.g., unexpected object 220). In some implementations, the interactive object annotation system may have the ability to override a new/updated classification selected by a remote operator if there is high-confidence in an alternative decision in a particular scene. For example, the interactive object annotation system may nullify a new/updated classification of "static" from an original classification of "moving" if the object being classified/reclassified moves a certain distance from its original position.

Figure 6:
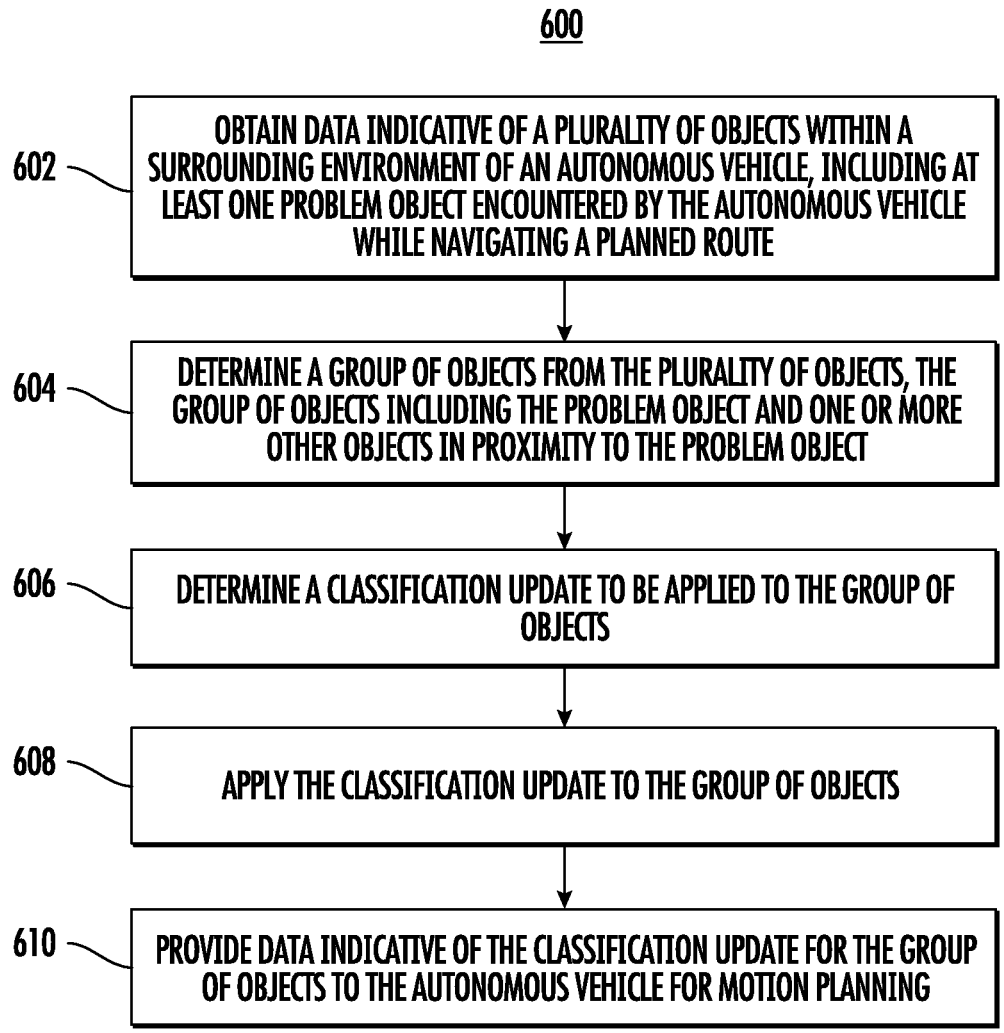
FIG. 6 depicts a flow diagram of an example method for performing interactive object annotation according to example embodiments of the present disclosure.

FIG. 6 depicts an example flow diagram of an example method 600 for autonomous vehicle motion planning according to example implementations of the present disclosure. One or more portion(s) of the method 600 can be implemented by a computing system that includes one or more computing devices such as, for example, the computing systems described with reference to the other figures (e.g., the vehicle computing system, the interactive object annotation system, the operations computing system, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1, 7-8, etc.), for example, to provide a motion plan based on uncertain data. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6 is described with reference to elements/terms described with respect to other systems and figures for exemplary illustrated purposes and is not meant to be limiting. One or more portions of method 600 can be performed additionally, or alternatively, by other systems.

At (602), the method 600 can include obtaining data indicative of a plurality of objects within a surrounding environment of an autonomous vehicle. For example, in some implementations, the plurality of objects can include at least at one problem object encountered by the autonomous vehicle while navigating a planned route. By way of example, the problem object can include an object that has been detected by the autonomous vehicle with incorrect object classification data.

In some implementations, the method can include providing data indicative of the plurality of objects for display. For example, the data indicative of the plurality of objects can include data indicative of the problem object along with the one or more other objects in proximity to the problem object within the plurality of objects.

At (604), the method 600 can include determining a group of objects from the plurality of objects. For example, in some implementations, the group of objects can include the problem object and one or more other objects in proximity to the problem object. The one or more other objects in proximity to the problem object, for example, can be selected based at least in part on one or more predefined rules. By way of example, the group of objects can include one or more unexpected objects such as, for example, one or more of construction objects in a construction zone of a roadway, foreign object debris in the roadway, parked emergency vehicles in the roadway, and/or an unknown class of object in close proximity to the autonomous vehicle.

In some implementations, the group of objects can be determined based on user input. For example, the method can include receiving a selection of the problem object and one or more of the other objects in proximity to the problem object from a display of the plurality of objects. By way of example, determining the group of objects of the plurality of objects can include receiving a first user input selection of the problem object and one or more of the other objects in proximity to the problem object from the plurality of objects displayed. By way of example, the method can include receiving a first user input indicative of one or more objects from the plurality of objects displayed. The group of objects can include, for example, each of the one or more objects indicated by the first user input.

In addition, or alternatively, the group of objects can be determined based on one or more machine learned models. For example, the method can include providing the plurality of objects to a model that is configured to determine the group of objects including the problem object. In addition, in some implementations, the model can be configured to determine a classification update for the group of objects.

At (606), the method 600 can include determining a classification update to be applied to the group of objects. For example, the classification update to be applied to the group of objects can include an indication that the group of objects are static and the autonomous vehicle should pass on the left of the group of objects, an indication that the group of objects are static and the autonomous vehicle should pass on the right of the group of objects, and/or an indication that the group of objects are not static objects.

In some implementations, the classification update can be determined based on user input. For example, the classification update can be determined based on an indication of the classification update provided by a vehicle operator. By way of example, determining the classification update to be applied to the group of objects can include receiving a second user input including an indication of the classification update to be applied to the group of objects. In this manner, a vehicle operator can select one or more objects to assign a classification and input one or more classification for each object and/or the group of objects.

At (608), the method 600 can include applying the classification update to the group of objects. For example, the classification update can facilitate the autonomous vehicle generating motion planning to navigate past the group of objects and continue along the planned route. In some implementations, an original classification of each object included in the group of objects is stored along with the classification update for each object included in the group of objects.

In some implementations, the method can further include providing a request for confirmation of the classification update to be applied to the group of objects (e.g., the selected group of objects). For example, the request for confirmation can be provided in response to receiving an indication of the classification update to be applied to the group of objects (e.g., the selected group of objects). In addition, in some implementations, the method can include receiving data indicating confirmation of the classification update to be applied to the group of objects (e.g., the selected group of objects) before applying the classification update to the group of objects (e.g., the selected group of objects).

At (610), the method 600 can include providing data indicative of the classification update for the group of objects to the autonomous vehicle for use in motion planning. For example, the autonomous vehicle can initiate one or more vehicle actions based on annotation data. By way of example, the autonomous vehicle can initiate a vehicle navigation change in response to receiving the annotation data. In this manner, the autonomous vehicle can navigate around the group of objects.

Figure 7:
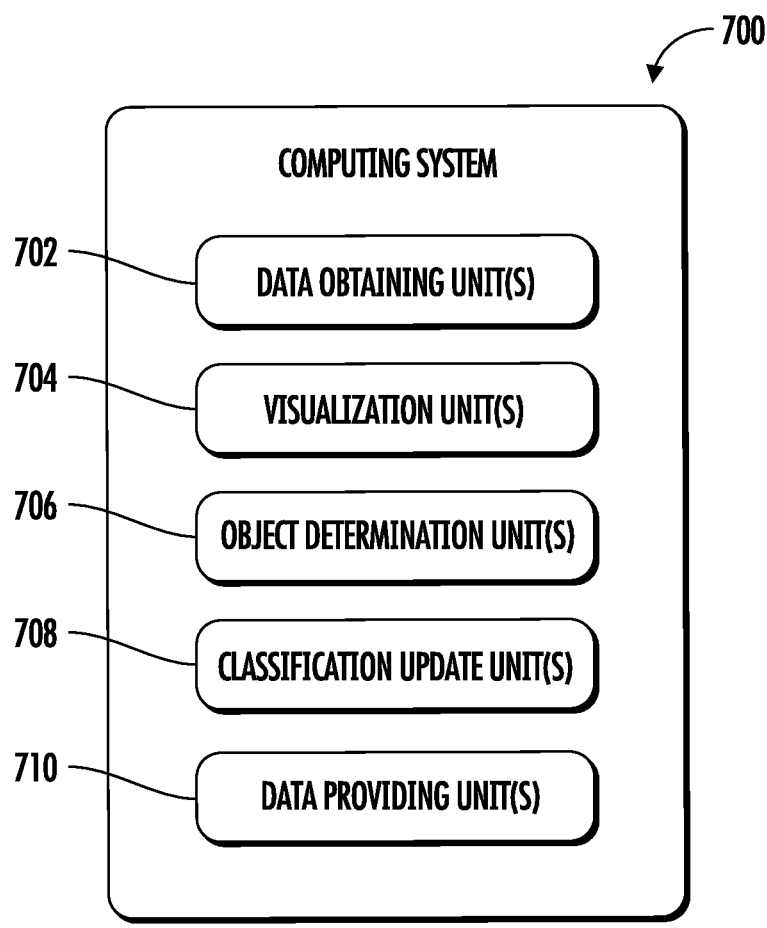
FIG. 7 depicts example units associated with a computing system for performing operations and functions according to example embodiments of the present disclosure.

Various means can be configured to perform the methods and processes described herein. For example, FIG. 7 depicts an example system 700 that includes various means according to example embodiments of the present disclosure. The computing system 700 can be and/or otherwise include, for example, the interactive object annotation system. The computing system 700 can include data obtaining unit(s) 702, visualization unit(s) 704, object determination unit(s) 706, classification update unit(s) 708, data providing unit(s) 710, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., the data obtaining unit(s) 702) can be configured to obtain data (e.g., telemetry data, etc.) from an autonomous vehicle that includes an indication of object(s) the autonomous vehicle is currently stuck on (e.g., unable to navigate). In addition, or alternatively, the data obtaining unit 702 can obtain sensor data indicative of a variety of information such as, for example, data indicative of a plurality of objects within the surrounding environment of the autonomous vehicle. The data obtaining unit 702 is an example of means obtaining such data from an autonomous vehicle at an operations computing system as described herein.

The means (e.g., the visualization unit(s) 704) can be configured to provide data with regard to a plurality of objects within the surrounding environment of the vehicle for display. For example, the means (e.g., the visualization unit(s) 704) can be configured to visualize the vehicle environment including the plurality of objects via a graphical user interface. In some implementations, the means (e.g., the visualization unit(s) 704) can be configured to indicate a problem object of the plurality of objects in the surrounding environment that the vehicle is currently stuck on (e.g., reacting to). The visualization unit 704 is one example of a means for providing data for display and selection as described herein.

The means (e.g., object determination unit(s) 706) can be configured to determine a group of objects, including a problem object, from the plurality of objects. For example, based on the displayed plurality of objects, the means (e.g., object determination unit(s) 706) can be configured to determine a selection of one or more objects in addition to the problem object to form a group of objects that can have a new/updated classification applied simultaneously. The object determination unit 706 is one example of a means for determining a group of objects as described herein.

The means (e.g., classification update unit(s) 708) can be configured to determine a new/updated classification for the group of objects. For example, the means (e.g., classification update unit(s) 708) can be configured to determine the selection of a new/updated classification that should be applied to the group of objects that will facilitate the autonomous vehicle appropriately navigating with regard to the group of objects. The means (e.g., classification update unit(s) 708) can be configured to simultaneously apply the new/updated classification to each of the objects within the group of objects. The classification update unit 708 is one example of a means for determining and applying a classification update to a group of objects as described herein.

The means (e.g., data providing unit(s) 710) can be configured to provide the applied classification updates for the group of objects to the autonomous vehicle to facilitate motion planning to navigate the autonomous vehicle with regard to the objects. The data providing unit 710 is one example of a means for providing the updated object classification to the autonomous vehicle as described herein.

These described functions of the means are provided as examples and are not meant to be limiting. The means can be configured for performing any of the operations and functions described herein.

Figure 8:
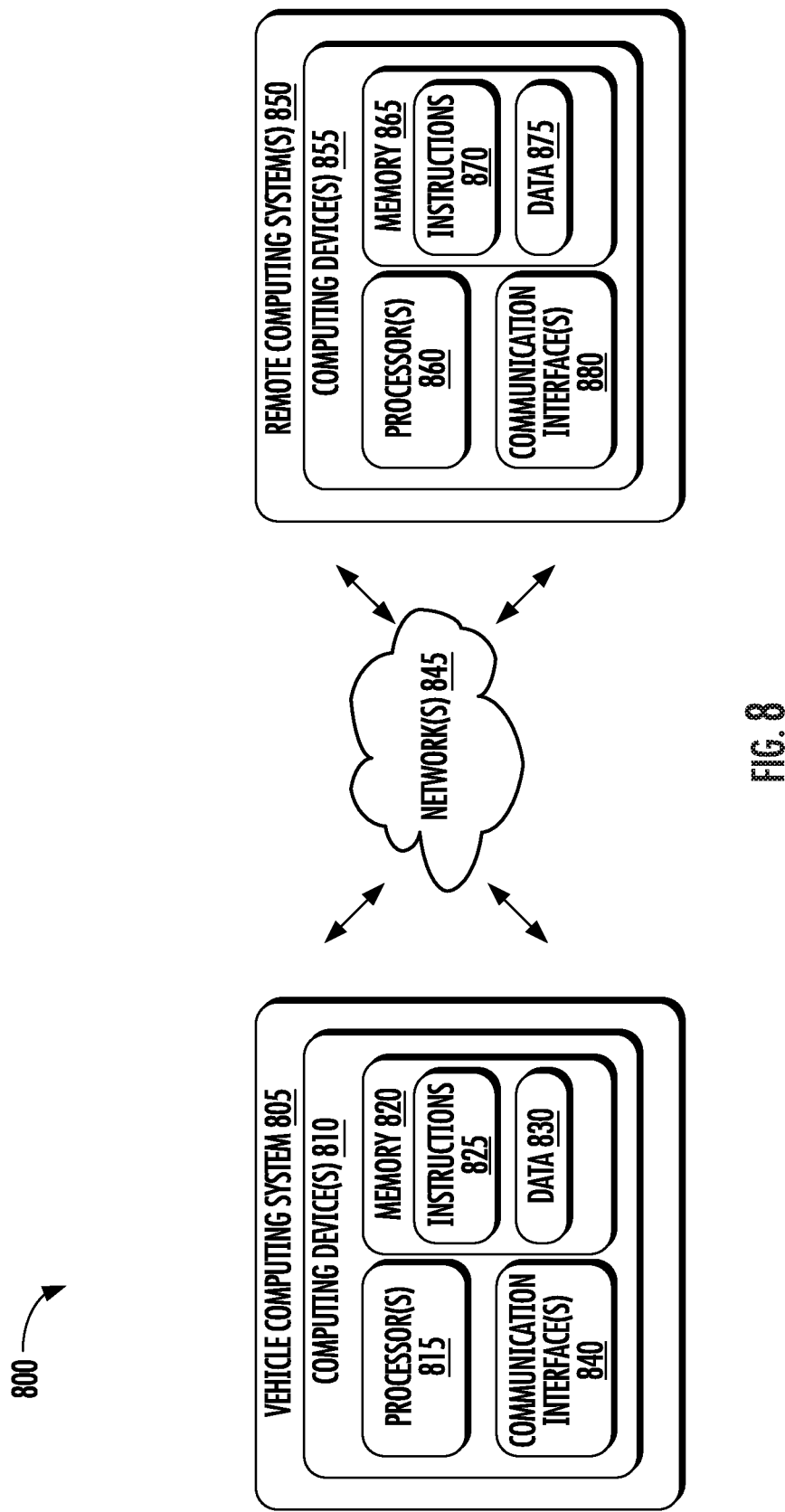
FIG. 8 depicts a block diagram of an example computing system according to example embodiments of the present disclosure.

FIG. 8 depicts example system components of an example system 800 according to example implementations of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include a vehicle computing system 805 (e.g., interactive object annotation system 150, motion planning system 128, etc.) and a remote computing system 850 that are communicatively coupled over one or more network(s) 845. As described herein, the vehicle computing system 805 can be implemented onboard a vehicle (e.g., as a portion of the vehicle computing system 112) and/or can be remote from a vehicle (e.g., as a portion of an operations computing system 104). In either case, a vehicle computing system 800 can utilize the operations and model(s) of the interactive object annotation system 150 (e.g., locally, via wireless network communication, etc.).

The vehicle computing system 805 can include one or computing device(s) 810. The computing device(s) 810 of the vehicle computing system 805 can include processor(s) 815 and a memory 820. The one or more processor(s) 815 can be any suitable processing device (e.g., a processor core, a microprocessor, an ASIC, a FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, etc., and/or combinations thereof.

The memory 820 can store information that can be obtained by the one or more processor(s) 815. For instance, the memory 820 (e.g., one or more non-transitory computer-readable storage mediums, memory devices, etc.) can include computer-readable instructions 825 that can be executed by the one or more processors 815. The instructions 825 can be software written in any suitable programming language or can be implemented in hardware. Additionally, or alternatively, the instructions 825 can be executed in logically and/or virtually separate threads on processor(s) 815.

For example, the memory 820 can store instructions 825 that when executed by the one or more processors 815 cause the one or more processors 815 (e.g., of the interaction object annotation system 150) to perform operations such as any of the operations and functions of the vehicle computing system 805 and/or for which the vehicle computing system 805 is configured, as described herein, the operations for controlling the motion of a vehicle based on annotated interactive objects (e.g., one or more portions of method 800), the operations and functions of any of the models described herein and/or for which the models are configured and/or any other operations and functions for the vehicle computing system 805, as described herein.

The memory 820 can store data 830 that can be obtained (e.g., received, accessed, written, manipulated, generated, created, stored, etc.). The data 830 can include, for instance, sensor data 116, map data 122, state data 130, prediction data 132, motion planning data 134, annotation data 152, and/or other data/information described herein. In some implementations, the computing device(s) 810 can obtain data from one or more memories that are remote from the vehicle computing system 805.

The computing device(s) 810 can also include a communication interface 835 used to communicate with one or more other system(s) (e.g., other systems onboard and/or remote from a vehicle, the other systems of FIG. 8, etc.). The communication interface 835 can include any circuits, components, software, etc. for communicating via one or more networks (e.g., 845). In some implementations, the communication interface 835 can include, for example, one or more of a communications controller, receiver, transceiver, transmitter, port, conductors, software and/or hardware for communicating data/information.

The remote computing system 850 can include one or more computing device(s) 855. The computing device(s) 855 can include one or more processors 860 and at least one memory 865. The one or more processors 860 can be any suitable processing device (e.g., a processor core, a microprocessor, an ASIC, a FPGA, a controller, a microcontroller, etc.) and can be one processor or a plurality of processors that are operatively connected. The memory 865 can include one or more tangible, non-transitory computer-readable storage media, such as RAM, ROM, EEPROM, EPROM, one or more memory devices, flash memory devices, data registers, etc., and combinations thereof.

The memory 865 can store information that can be accessed by the one or more processors 860. For instance, the memory 865 (e.g., one or more tangible, non-transitory computer-readable storage media, one or more memory devices, etc.) can include computer-readable instructions 870 that can be executed by the one or more processors 860. The instructions 870 can be software written in any suitable programming language or can be implemented in hardware.

Additionally, or alternatively, the instructions 870 can be executed in logically and/or virtually separate threads on processor(s) 860.

For example, the memory 865 can store instructions 870 that when executed by the one or more processors 860 cause the one or more processors 860 to perform operations such as any of the operations and functions of the vehicle computing system 805, the remote computing system 850 and/or computing device(s) 855, or for which any of these computing systems are configured, as described herein, one or more portions of the method 600 as further described herein, operations and functions of the interactive object annotation system 150, and/or any other operations and functions described herein.

The memory 865 can store data 875 that can be obtained and/or stored. The data 875 can include, for instance, services data (e.g., trip data, route data, user data, infrastructure system requirement data, etc.), data associated with autonomous vehicles (e.g., vehicle data, maintenance data, ownership data, sensor data 116, map data 122, perception data 130, prediction data 132, motion planning data 134, object states and/or state data 130, object motion trajectories, feedback data, log data, etc.), data associated with one or more interactive objects (e.g., annotation data 152, etc.), and/or other data/information as described herein. In some implementations, the computing device(s) 855 can obtain data from one or more memories that are remote from the remote computing system 850.

The computing device(s) 855 can also include a communication interface 880 used to communicate with one or more other system(s) (e.g., the vehicle computing system 805, etc.). The communication interface 880 can include any circuits, components, software, etc. for communicating via one or more networks (e.g., network(s) 845). In some implementations, the communication interface 880 can include, for example, one or more of a communications controller, receiver, transceiver, transmitter, port, conductors, software, and/or hardware for communicating data.

The network(s) 845 can be any type of network or combination of networks that allows for communication between devices. In some embodiments, the network(s) 845 can include one or more of a local area network, wide area network, the Internet, secure network, cellular network, mesh network, peer-to-peer communication link and/or some combination thereof and can include any number of wired or wireless links. Communication over the network(s) 845 can be accomplished, for instance, via a network interface using any type of protocol, protection scheme, encoding, format, packaging, etc.

Computing tasks discussed herein as being performed at computing device(s) remote from an autonomous vehicle can instead be performed at the vehicle (e.g., via the vehicle computing system 800), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, the method comprising:
    obtaining, from an autonomous vehicle and by a computing system comprising one or more computing devices that are remote from the autonomous vehicle, data describing a plurality of objects within a surrounding environment of the autonomous vehicle, the data indicating that at least one of plurality of objects is a problem object encountered by the autonomous vehicle while navigating a planned route;
    determining, by the computing system, a group of objects of the plurality of objects, the group of objects including the problem object and one or more other objects in proximity to the problem object;
    determining, by the computing system, a common classification update to be applied to the group of objects;
    applying, by the computing system, the common classification update to the group of objects; and
    providing, by the computing system, data indicative of the common classification update for the group of objects to the autonomous vehicle for use in motion planning.

2. The computer-implemented method of claim 1, wherein the problem object has been detected by the autonomous vehicle with incorrect object classification data.

3. The computer-implemented method of claim 1, wherein the common classification update to be applied to the group of objects comprises:
    an indication that the group of objects are static and the autonomous vehicle should pass on the left of the group of objects;
    an indication that the group of objects are static and the autonomous vehicle should pass on the right of the group of objects; or
    an indication that the group of objects are not static objects.

4. The computer-implemented method of claim 1, wherein the common classification update facilitates the autonomous vehicle generating motion planning to navigate past the group of objects and continue along the planned route.

5. The computer-implemented method of claim 1, wherein the group of objects comprises one or more of:
    construction objects in a construction zone of a roadway;
    foreign object debris in the roadway;
    parked emergency vehicles in the roadway; or
    an unknown class object in close proximity to the autonomous vehicle.

6. The computer-implemented method of claim 1, wherein an original classification of each object included in the group of objects is stored along with the common classification update for each object included in the group of objects.

7. The computer-implemented method of claim 1, further comprising:
    providing, by the computing system, data indicative of the plurality of objects for display, wherein the data indicative of the plurality of objects comprises data indicative of the problem object along with the one or more other objects in proximity to the problem object within the plurality of objects.

8. The computer-implemented method of claim 7,
wherein determining, by the computing system, the group of objects of the plurality of objects comprises receiving a first user input selection of the problem object and one or more of the other objects in proximity to the problem object from the plurality of objects displayed; and
wherein determining, by the computing system, the common classification update to be applied to the group of objects comprises receiving a second user input comprising an indication of the common classification update to be applied to the group of objects.

9. The computer-implemented method of claim 8, wherein the one or more other objects in proximity to the problem object are selected based at least in part on one or more predefined rules.

10. The computer-implemented method of claim 8 further comprising:
in response to receiving an indication of the common classification update to be applied to the group of objects, providing, by the computing system, a request for confirmation of the common classification update to be applied to the group of objects; and
receiving, by the computing system, data indicating confirmation of the common classification update to be applied to the group of objects before applying the common classification update to the group of objects.

11. The computer-implemented method of claim 1, further comprising:
providing, by the computing system, the plurality of objects to a model that is configured to determine the group of objects comprising the problem object from the plurality of objects and determine the common classification update for the group of objects.

12. A computing system, comprising:
one or more processors; and
one or more memories including instructions that, when executed by the one or more processors, cause the one or more processors to perform operations, the operations comprising:
obtaining, from an autonomous vehicle, data describing a plurality of objects within a surrounding environment of the autonomous vehicle, the data indicating that at least one of the plurality of objects is a problem object encountered by the autonomous vehicle while navigating a planned route;
determining a group of objects of the plurality of objects, the group of objects including the problem object and one or more other objects in proximity to the problem object;
determining a common classification update to be applied to the group of objects;
applying the common classification update to the group of objects; and
providing data indicative of the common classification update for the group of objects to the autonomous vehicle for use in motion planning.

13. The computing system of claim 12, wherein the problem object has been detected by the autonomous vehicle with incorrect object classification data.

14. The computing system of claim 12, wherein the common classification update to be applied to the group of objects comprises:

an indication that the group of objects are static and the autonomous vehicle should pass on the left of the group of objects;
an indication that the group of objects are static and the autonomous vehicle should pass on the right of the group of objects; or
an indication that the group of objects are not static objects.

15. The computing system of claim 12, wherein the group of objects comprises one or more of:
construction objects in a construction zone of a roadway;
foreign object debris in the roadway;
parked emergency vehicles in the roadway; or
an unknown class object in close proximity to the autonomous vehicle.

16. The computing system of claim 12, wherein an original classification of each object included in the group of objects is stored along with the common classification update for each object included in the group of objects.

17. The computing system of claim 12,
wherein determining the group of objects of the plurality of objects, the group of objects including the problem object and one or more other objects in proximity to the problem object comprises receiving a selection of the problem object and one or more of the other objects in proximity to the problem object from a display of the plurality of objects; and
wherein determining the common classification update to be applied to the group of objects comprises receiving an indication of the common classification update to be applied to the group of objects.

18. The computing system of claim 12, wherein the operations further comprise:
providing the plurality of objects to a model that is configured to determine the group of objects inclusive of the problem object from the plurality of objects and to determine the common classification update for the group of objects.

19. One or more tangible, non-transitory computer-readable media storing computer-readable instructions that when executed by one or more processors cause the one or more processors to perform operations, the operations comprising:
obtaining, from an autonomous vehicle, data describing a plurality of objects within a surrounding environment of the autonomous vehicle, the data indicating that at least one of the plurality of objects is a problem object encountered by the autonomous vehicle while navigating a planned route;
determining a group of objects of the plurality of objects, the group of objects including the problem object and one or more other objects in proximity to the problem object;
determining a common classification update to be applied to the group of objects;
applying the common classification update to the group of objects; and
providing data indicative of the common classification update for the group of objects to the autonomous vehicle for use in motion planning.

20. The one or more tangible, non-transitory computer-readable media of claim 19, wherein the common classification update to be applied to the group of objects comprises:
an indication that the group of objects are static and the autonomous vehicle should pass on the left of the group of objects;

an indication that the group of objects are static and the autonomous vehicle should pass on the right of the group of objects; or an indication that the group of objects are not static objects.

* * * * *